United States Patent
Singh et al.

(10) Patent No.: US 10,050,855 B1
(45) Date of Patent: Aug. 14, 2018

(54) MAINTAINING A TUNNEL LIVENESS SESSION IN A MULTI-CHASSIS LINK AGGREGATION GROUP TOPOLOGY

(71) Applicant: Juniper Networks, Inc., Sunnyvale, CA (US)

(72) Inventors: Kamal Singh, Sunnyvale, CA (US); Pratibha Zalakikar, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 231 days.

(21) Appl. No.: 14/973,169

(22) Filed: Dec. 17, 2015

(51) Int. Cl.
  *H04L 12/26* (2006.01)
  *H04L 12/751* (2013.01)
  *H04L 29/08* (2006.01)

(52) U.S. Cl.
  CPC .......... *H04L 43/0811* (2013.01); *H04L 43/10* (2013.01); *H04L 45/026* (2013.01); *H04L 67/145* (2013.01)

(58) Field of Classification Search
  CPC ....... H04L 45/245; H04L 49/25; H04L 45/28; H04L 49/70; H04L 41/12; H04L 45/586; H04L 12/4641; H04L 45/66; H04L 41/0668; H04L 41/0654; H04L 43/0811; H04L 45/02; H04L 45/22; H04L 12/4633
  See application file for complete search history.

(56) References Cited

U.S. PATENT DOCUMENTS

| | | | | |
|---|---|---|---|---|
| 2010/0268807 A1* | 10/2010 | Calippe | ............... | H04L 41/0233 709/223 |
| 2016/0036728 A1* | 2/2016 | Duda | .................. | H04L 12/4633 370/357 |
| 2016/0119229 A1* | 4/2016 | Zhou | ................... | H04L 12/4633 370/392 |
| 2016/0261501 A1* | 9/2016 | Hegde | ..................... | H04L 47/12 |

OTHER PUBLICATIONS

Alex, https://eos.arista.com/vxlan-with-mlag-configuration-guide/, "VXLAN bridging with MLAG", ARISTA, Apr. 27, 2015, 11 pages.

* cited by examiner

*Primary Examiner* — Wutchung Chu
*Assistant Examiner* — Najeebuddin Ansari
(74) *Attorney, Agent, or Firm* — Harrity & Harrity, LLP (57) ABSTRACT

A first peer, of a plurality of peers, may receive a packet directed to a network address. The network address may identify a tunnel endpoint of a tunnel via which traffic, associated with a multi-homed client, is transferred. The multi-homed client may be connected to each peer of the plurality of peers. The first peer may identify the packet as being associated with the multi-homed client. The first peer may update first information, associated with the tunnel, based on identifying the packet as being associated with the multi-homed client. The first peer may provide the packet to a second peer of the plurality of peers. The second peer may receive the packet and may update second information, associated with the tunnel, based on receiving the packet provided by the first peer. The first information and the second information may be updated to indicate an operational status of the tunnel.

20 Claims, 8 Drawing Sheets

MAINTAINING A TUNNEL LIVENESS SESSION IN A MULTI-CHASSIS LINK AGGREGATION GROUP TOPOLOGY

BACKGROUND

A multi-chassis link aggregation group (MC-LAG) is a type of link aggregation group including ports that terminate on different (i.e., separate) chassis. MC-LAG may be used to provide redundancy in the event that one or more of the separate chassis fail.

SUMMARY

According to some possible implementations, a MC-LAG may include a first MC-LAG peer, of a plurality of MC-LAG peers, to: receive a packet directed to a network address, where the network address may be a tunnel endpoint address of a tunnel via which traffic, associated with a multi-homed client, is transferred, where the multi-homed client may be connected to each MC-LAG peer of the plurality of MC-LAG peers; identify the packet as a tunnel liveness packet, associated with the multi-homed client, based on the network address; update first tunnel liveness information, associated with the tunnel, based on identifying the packet as a tunnel liveness packet associated with the multi-homed client; and provide the packet to a second MC-LAG peer, of the plurality of MC-LAG peers, to cause second tunnel liveness information, associated with the tunnel, to be updated, where the first tunnel liveness information and the second tunnel liveness information may be updated to indicate an operational status of the tunnel.

According to some possible implementations, a non-transitory computer-readable medium may store instructions that, when executed by one or more processors, cause the one or more processors to: receive a packet destined for a network address corresponding to a tunnel endpoint of a tunnel via which traffic, associated with a multi-homed client, can be transferred, where the multi-homed client may being connected to each MC-LAG peer of a plurality of MC-LAG peers; identify the packet as a tunnel liveness packet associated with the multi-homed client; update a first instance of a tunnel liveness session, associated with the tunnel, based on identifying the packet as a tunnel liveness packet associated with the multi-homed client, where the first instance of the tunnel liveness session may be maintained by a first MC-LAG peer of the plurality of MC-LAG peers; and provide the packet to cause a second instance of the tunnel liveness session, associated with the tunnel, to be updated, where the second instance of the tunnel liveness session may be maintained by a second MC-LAG peer of the plurality of MC-LAG peers, where the first instance of the tunnel liveness session and the second instance of the tunnel liveness session may be updated such that the tunnel liveness session is concurrently maintained by the first MC-LAG peer and the second MC-LAG peer.

According to some possible implementations, a method may include: receiving, by a first peer of a plurality of peers, a packet directed to a network address, where the network address may identify a tunnel endpoint of a tunnel via which traffic, associated with a multi-homed client, is transferred, where the multi-homed client may be connected to each peer of the plurality of peers; identifying, by the first peer and based on the network address, the packet as being associated with the multi-homed client; updating, by the first peer, first information, associated with the tunnel, based on identifying the packet as being associated with the multi-homed client; providing, by the first peer, the packet to a second peer of the plurality of peers; receiving, by the second peer, the packet provided by the first peer; and updating, by the second peer, second information, associated with the tunnel, based on receiving the packet provided by the first peer, where the first information and the second information may be updated to indicate an operational status of the tunnel.

DETAILED DESCRIPTION

The following detailed description of example implementations refers to the accompanying drawings. The same reference numbers in different drawings may identify the same or similar elements.

An MC-LAG may include two or more network devices (herein referred to as MC-LAG peers) capable of providing Layer 2 services over a Layer 3 network. For example, the MC-LAG may include a pair of switches configured to provide a virtual extensible local area network (VXLAN) service, such as transferring traffic via VXLAN tunnels. Here, one or more client devices (i.e., devices from which and/or to which the VXLAN traffic is to be received and/or sent) may be single-homed to the MC-LAG (i.e., connected to a single MC-LAG peer of the MC-LAG) or multi-homed to the MC-LAG (i.e., connected to two or more MC-LAG peers of the MC-LAG).

For a multi-homed client device, a single MC-LAG peer of the MC-LAG may act as an endpoint of a VXLAN tunnel (herein referred to as a VXLAN tunnel endpoint (VTEP)) associated with sending and/or receiving VXLAN traffic. For example, during configuration of the MC-LAG, a particular MC-LAG peer may be configured as an active peer (e.g., an MC-LAG peer associated with initiation and/or termination a VXLAN tunnel), while one or more other MC-LAG peers may be configured as standby peers. Here, the active peer of the MC-LAG may act as a VTEP associated with the VXLAN tunnel. In other words, the VXLAN tunnel may be initiated and terminated only at the active peer of the MC-LAG (e.g., rather than multiple MC-LAG peers of the MC-LAG). As such, when the active peer is rebooted, changes mode, is powered-off, fails, or the like, the other MC-LAG peers of the MC-LAG may be unable to send and/or receive traffic via the VXLAN tunnel.

Moreover, only the active peer may be configured to maintain a tunnel liveness session associated with detecting a failure of the VXLAN tunnel, such as a bidirectional forwarding detection (BFD) session. In other words, the tunnel liveness session may be maintained only at the active peer of the MC-LAG (e.g., rather than multiple MC-LAG peers of the MC-LAG). As such, when the active peer is rebooted, changes mode, is powered-off, fails, or the like, the other MC-LAG peers of the MC-LAG may be unable to maintain the tunnel liveness session, which may result in an inability of the MC-LAG to detect a failure associated with the VXLAN tunnel.

Implementations described herein may allow an MC-LAG to initiate and/or terminate a VXLAN tunnel on multiple MC-LAG peers of the MC-LAG, while maintaining a tunnel liveness session, associated with the VXLAN tunnel, across the multiple MC-LAG peers. This may improve VXLAN service by providing redundancy for both the VXLAN tunnel and the tunnel liveness session.

Notably, while the systems and/or methods described herein are described as being applied to VXLAN tunnels initiating and/or terminating at an MC-LAG, in some implementations, these systems and/or methods may be applied to another type of overlay tunnel capable of being initiated and/or terminated at an MC-LAG.

Figure 1A:
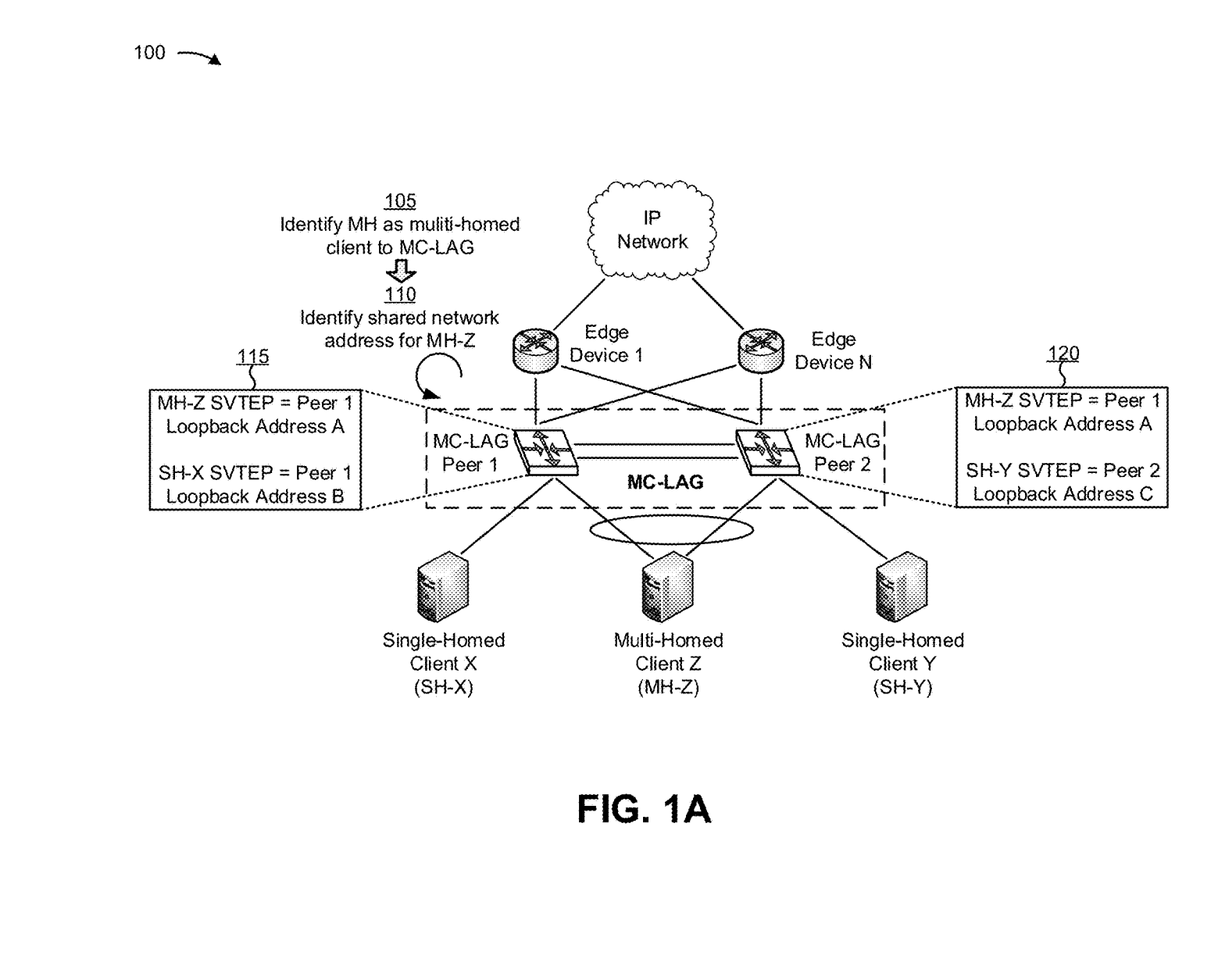
FIGS. 1A-1C are diagrams of an overview of an example implementation described herein.
Figure 1B:
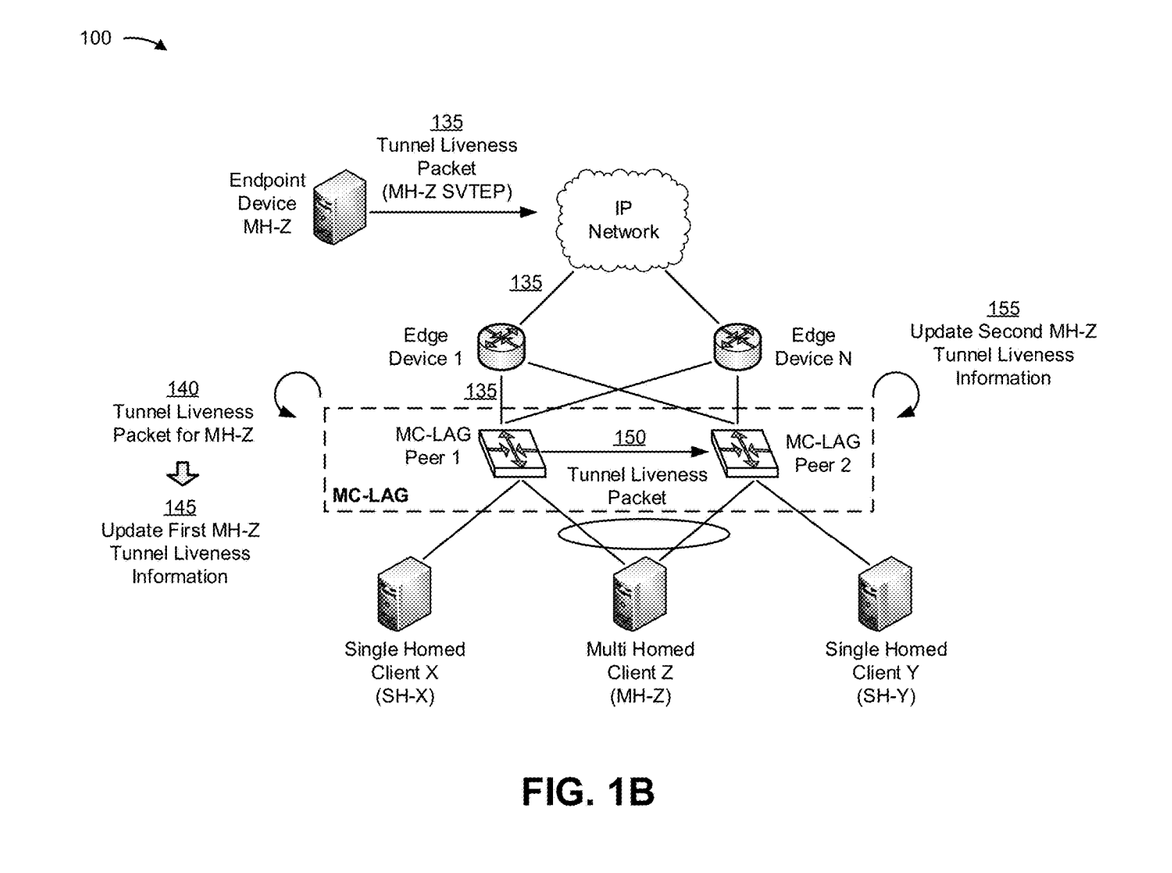
Figure 1C:
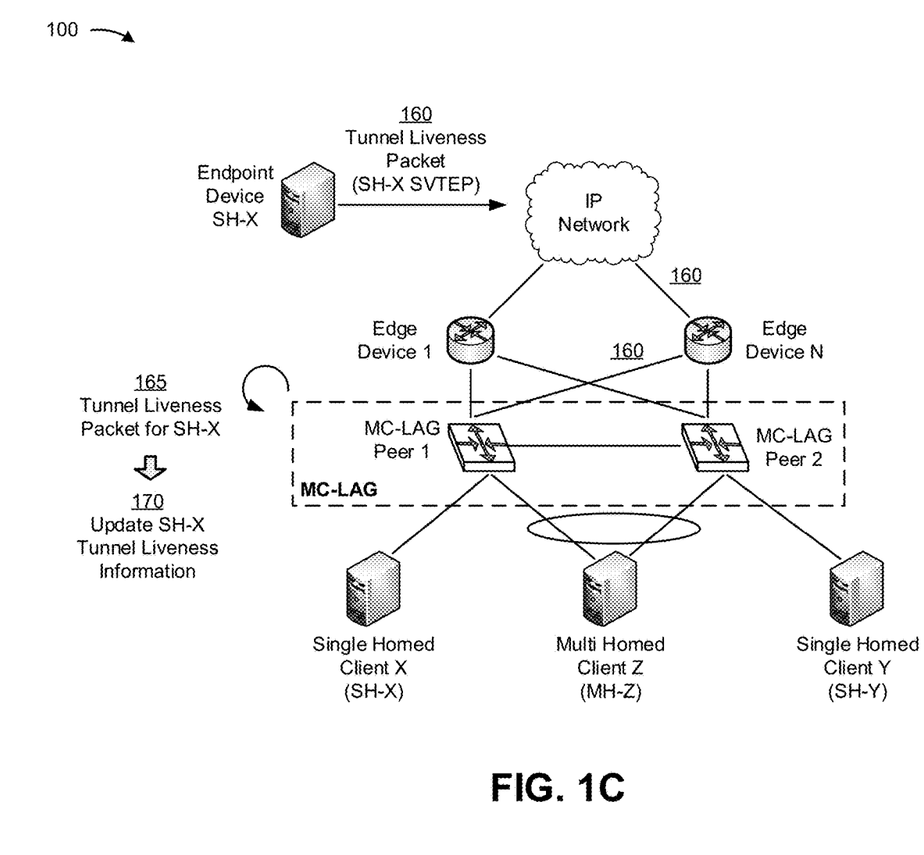

FIGS. 1A-1C are diagrams of an overview of an example implementation 100 described herein. For the purposes of example implementation 100, assume that an MC-LAG includes a pair of MC-LAG peers (e.g., MC-LAG peer 1 and MC-LAG peer 2). Further, assume that a first client device (e.g., single-homed client X) is single-homed to MC-LAG peer 1, a second client device (e.g., multi-homed client Z) is dual-homed to MC-LAG peer 1 and MC-LAG peer 2, and that a third client device (e.g., single-homed client Y) is single-homed to MC-LAG peer 2. Finally, assume that VXLAN traffic may pass through VXLAN tunnels, associated with each client device, that may be initiated and/or terminated at the MC-LAG and may use an IP network and a group of edge devices (e.g., edge device 1 through edge device N).

As shown in FIG. 1A, and by reference number 105, the MC-LAG may identify multi-homed client Z as being dual-homed to MC-LAG peer 1 and MC-LAG peer 2. In some implementations, the MC-LAG may also identify single-homed client X as being single-homed to MC-LAG peer 1, and may identify single-homed client Y as being single-homed to MC-LAG peer 2.

As shown by reference number 110, based on identifying multi-homed client Z as being dual-homed to MC-LAG peer 1 and MC-LAG peer 2, the MC-LAG may identify a shared network address to be used in association with multi-homed client Z. The shared network address may include a network address that is to be configured on the multiple MC-LAG peers connected to multi-homed client Z in order to cause a VXLAN tunnel, associated with multi-homed client Z, to initiate and/or terminate on any of MC-LAG peer 1 or MC-LAG peer 2. For example, the shared address may include an Internet protocol (IP) address, such as an IP address associated with a loopback interface of MC-LAG peer 1 or MC-LAG peer 2 (e.g., as selected by the MC-LAG). For the purposes of example implementation 100, assume that the MC-LAG identifies the shared network address, associated with multi-homed client Z, as a first IP address associated with a loopback interface of MC-LAG peer 1 (e.g., peer 1 loopback address A).

As shown by reference number 115, based on identifying the shared network address, the MC-LAG may configure a first tunnel endpoint address of MC-LAG peer 1 (e.g., a first source VXLAN tunnel endpoint address (SVTEP) address field of MC-LAG peer 1), associated with multi-homed client Z, with the shared network address. In some implementations, MC-LAG peer 1 may store information indicating that a VXLAN tunnel corresponding to multi-homed client Z is associated with the shared network address.

As further shown, the MC-LAG may also configure a second tunnel endpoint address of MC-LAG peer 1 (e.g., a second SVTEP address field of MC-LAG peer 1), associated with single-homed client X, with another MC-LAG peer 1 network address (e.g., peer 1 loopback address B). In some implementations, MC-LAG peer 1 may store information indicating that a VXLAN tunnel corresponding to single-homed client X is associated with the other MC-LAG peer 1 loopback address.

Similarly, as shown by reference number 120, the MC-LAG may configure a first tunnel endpoint address of MC-LAG peer 2 (e.g., a first SVTEP address field of MC-LAG peer 2), associated with multi-homed client Z, with the shared network address. In some implementations, MC-LAG peer 2 may store information indicating that a VXLAN tunnel corresponding to multi-homed client Z is associated with the shared network address.

As further shown, the MC-LAG may also configure a second tunnel endpoint address of MC-LAG peer 2 (e.g., a second SVTEP address field of MC-LAG peer 2), associated with single-homed client Y, with another MC-LAG peer 2 network address (e.g., peer 2 loopback address C). In some implementations, MC-LAG peer 2 may store information indicating that a VXLAN tunnel corresponding to single-homed client Y is associated with the other MC-LAG peer 2 loopback address.

In this way, the MC-LAG may be configured such that: (1) MC-LAG peer 1 and MC-LAG peer 2 are each capable of initiating and/or terminating the VXLAN tunnel associated with multi-homed client Z, (2) MC-LAG peer 1 is capable of initiating and/or terminating the VXLAN tunnel associated with single-homed client X, and (3) MC-LAG peer 2 is capable of initiating and/or terminating the VXLAN tunnel associated with single-homed client Y, as shown below.

As shown in FIG. 1B, and by reference number 135, an endpoint device, associated with the multi-homed client Z VXLAN tunnel (e.g., a device at an opposite end of the VXLAN tunnel associated with multi-homed client Z), may provide a tunnel liveness packet destined for the tunnel endpoint address associated with multi-homed client Z (i.e., the tunnel liveness packet may include peer 1 loopback address A). A tunnel liveness packet may include a packet associated with a tunnel liveness session for detecting a failure associated with a VXLAN tunnel. For example, the tunnel liveness packet may include a bidirectional forwarding detection (BFD) packet associated with a BFD session for detecting a failure associated with a VXLAN tunnel. As further shown, the tunnel liveness packet may be provided to MC-LAG peer 1 (e.g., via the IP network and edge device 1).

As shown by reference number 140, MC-LAG peer 1 may determine, based on the inclusion of peer 1 loopback address A within the packet, that the packet is associated with multi-homed client Z. As shown by reference number 145, based on determining that the tunnel liveness packet is associated with multi-homed client Z, MC-LAG peer 1 may update first tunnel liveness information associated with the multi-homed client Z VXLAN tunnel. The first tunnel liveness information may include information, maintained by MC-LAG peer 1 and associated with a first instance of a tunnel liveness session for the multi-homed client Z VXLAN tunnel, that indicates that the multi-homed client Z VLXAN tunnel is operational.

As shown by reference number 150, based on determining that that tunnel liveness packet is associated with multi-homed client Z, MC-LAG peer 1 may also provide (e.g., via an inter-chassis link) the tunnel liveness packet to MC-LAG peer 2. As shown by reference number 155, MC-LAG peer 2 may receive the tunnel liveness packet, and may also determine that the tunnel liveness packet is associated with multi-homed client Z. MC-LAG peer 2 may then update second tunnel liveness information associated with the multi-homed client Z VXLAN tunnel. The second tunnel liveness information may include information, maintained by MC-LAG peer 2 and associated with a second instance of the tunnel liveness session for the multi-homed client Z VXLAN tunnel, that indicates that the multi-homed client Z VLXAN tunnel is operational.

In this way, each MC-LAG peer, on which the multi-homed client Z VXLAN tunnel is maintained, may update a respective instance of the tunnel liveness session associated with the VXLAN tunnel (e.g., such that each of the MC-LAG peers maintains a matching tunnel liveness session). This improves VXLAN service by providing redundancy for the tunnel liveness session associated with the VXLAN tunnel.

As shown in FIG. 1C, and by reference number 160, an endpoint device, associated with the single-homed client X VXLAN tunnel (e.g., a device at an opposite end of the VXLAN tunnel associated with single-homed client X), may provide a tunnel liveness packet destined for the tunnel endpoint address associated with single-homed client X (i.e., the tunnel liveness packet may include peer 1 loopback address B). As further shown, the tunnel liveness packet may be provided to MC-LAG peer 1 (e.g., via the IP network and edge device N).

As shown by reference number 165, MC-LAG peer 1 may determine, based on the inclusion of peer 1 loopback address B within the packet, that the packet is associated with single-homed client X. As shown by reference number 170, based on determining that the tunnel liveness packet is associated with single-homed client X, MC-LAG peer 1 may update tunnel liveness information associated with the single-homed client X VXLAN tunnel. The tunnel liveness information may include information, maintained by MC-LAG peer 1 and associated with a tunnel liveness session for the single-homed client X VXLAN tunnel, that indicates that the single-homed client X tunnel is operational. Notably, since single-homed client X is single-homed to MC-LAG peer 1, MC-LAG peer 1 may not provide the tunnel liveness packet to MC-LAG peer 2 (e.g., since MC-LAG peer 2 will not maintain a tunnel liveness session associated with the single-homed client X VXLAN tunnel).

In this way, an MC-LAG may initiate and/or terminate a VXLAN tunnel on multiple MC-LAG peers of the MC-LAG, while maintaining a tunnel liveness session, associated with the VXLAN tunnel, across the multiple MC-LAG peers.

Figure 2:
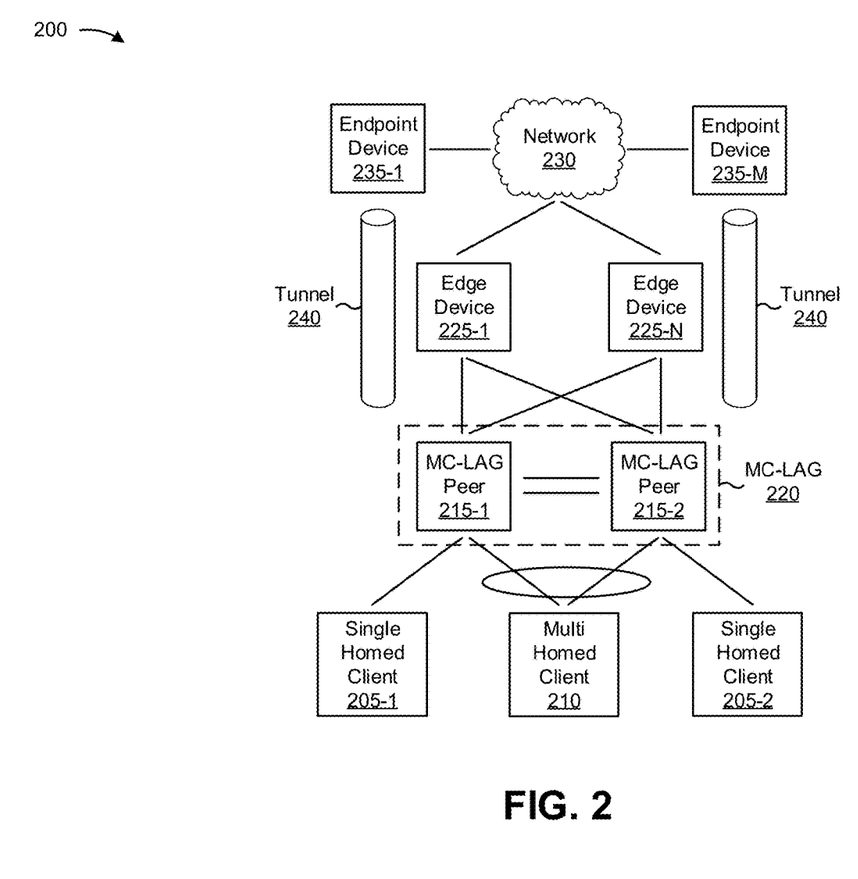
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of single-homed clients 205 (e.g., single-homed client 205-1 and single-homed client 205-2), a multi-homed client 210, an MC-LAG 220 including MC-LAG peer 215-1 and MC-LAG peer 215-2, one or more edge devices 225-1 through 225-N (N≥1) (herein referred to collectively as edge devices 225 and individually as edge device 225), a network 230, and one or more endpoint devices 235-1 through 235-M (M≥1) (herein referred to collectively as endpoint devices 235 and individually as endpoint device 235) capable of communicating with MC-LAG 220 via tunnels 240. Devices of environment 200 may interconnect via wired connections, wireless connections, or a combination of wired and wireless connections.

Single-homed client 205 may include a device capable of sending and/or receiving VXLAN traffic to and/or from a single MC-LAG peer 215 of MC-LAG 220. For example, single-homed client 205 may include a server, a group of servers, a gateway, a router, a switch, a modem, a network interface card (NIC), a hub, a bridge, an optical add-drop multiplexer (OADM), a firewall device, a computer device, or the like. In some implementations, single-homed client 205 may be associated with tunnel 240 via which traffic may be transferred, such as a VXLAN tunnel.

Multi-homed client 210 may include a device capable of sending and/or receiving VXLAN traffic to and/or from two or more MC-LAG peers 215 of MC-LAG 220. For example, multi-homed client 210 may include a server, a group of servers, a gateway, a router, a switch, a modem, a NIC, a hub, a bridge, an OADM, a firewall device, a computer device, or the like. In some implementations, multi-homed client 210 may be associated with tunnel 240 via which traffic may be transferred.

MC-LAG peer 215 may include a device, included in MC-LAG 220, that is capable of initiating and/or terminating a VXLAN tunnel associated with processing and/or transferring VXLAN traffic. For example, MC-LAG peer 215 may include a gateway, a router, a switch, a server, a modem, a NIC, a hub, a bridge, an OADM, or the like. In some implementations, multiple MC-LAG peers 215 (e.g., a pair of MC-LAG peers 215), may be included in MC-LAG 220. MC-LAG 220 may include two or more MC-LAG peers 215 configured to act as a single, logical device associated with transferring VXLAN traffic. In some implementations, MC-LAG 220 may be capable of acting as an endpoint of one or more tunnels 240, such as a one or more VXLAN tunnels.

Edge device 225 may include a device, positioned at an edge of network 230 that is capable of processing and/or transferring traffic. For example, edge device 225 may include a gateway, a router, a switch, a server, a modem, a NIC, a hub, a bridge, an optical add-drop multiplexer, an OADM, or the like. In some implementations, edge device 225 may be positioned at an edge of network 230. In some implementations, tunnels 240 may pass VXLAN traffic via edge devices 225.

Network 230 may include one or more wired and/or wireless networks via which traffic, associated with a tunnel, may be transferred. For example, network 230 may include an IP network via which VXLAN traffic may be transferred (e.g., via tunnels 240). In some implementations, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

Endpoint device 235 may include a device capable of acting as an endpoint of tunnel 240 via which traffic may be transferred. For example, endpoint device 235 may include a server, a group of servers, a gateway, a router, a switch, a modem, a NIC, a hub, a bridge, an OADM, a computer device, or the like that is positioned at an opposite end of tunnel 240 from MC-LAG 220.

Tunnel 240 may include a tunnel via which traffic may be transferred. For example, tunnel 240 may include a VXLAN tunnel between MC-LAG 220 and endpoint device 235 (e.g., via network 230). In some implementations, tunnel 240 may be described by two or more VTEPs identified by two or more respective network addresses.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
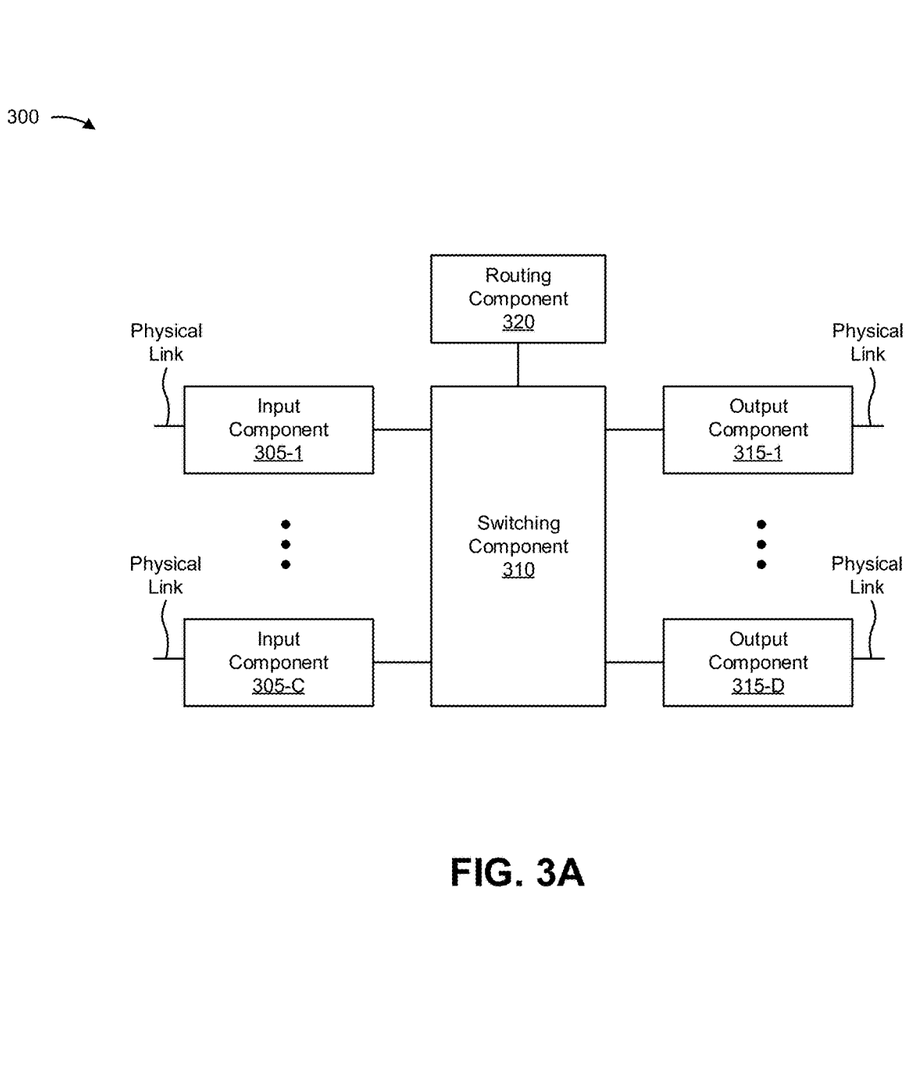
FIGS. 3A and 3B are diagrams of example components of one or more devices of FIG. 2.

FIG. 3A is a diagram of example components of a device 300. Device 300 may correspond to single-homed client 205, multi-homed client 210, MC-LAG peer 215, edge device 225, and/or endpoint device 235. In some implementations, single-homed client 205, multi-homed client 210, MC-LAG peer 215, edge device 225, and/or endpoint device 235 may include one or more devices 300 and/or one or more components of device 300. As shown in FIG. 3A, device 300 may include one or more input components 305-1 through 305-C (C≥1) (hereinafter referred to collectively as input components 305, and individually as input component 305), a switching component 310, one or more output components 315-1 through 315-D (D≥1) (hereinafter referred to collectively as output components 315, and individually as output component 315), and a routing component 320.

Input component 305 may include points of attachment for physical links and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 may include one or more processors. A processor, as used herein, is implemented in hardware, firmware, or a combination of hardware and software. A processor may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, a processor may include one or more processors that can be programmed to perform a function. In some implementations, routing component 320 may be programmed to perform one or more functions, as described in detail below.

In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
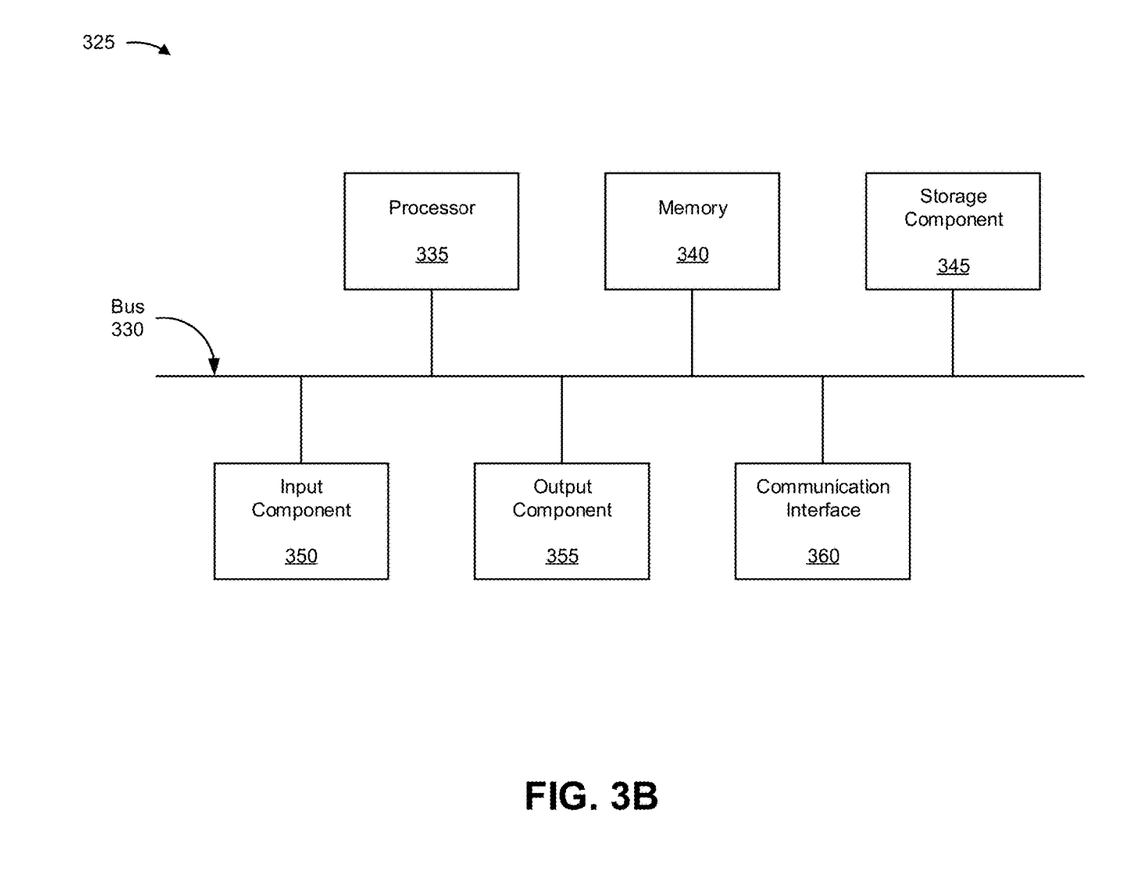

FIG. 3B is a diagram of example components of a device 325. Device 325 may correspond to single-homed client 205, multi-homed client 210, and/or endpoint device 235. In some implementations, single-homed client 205, multi-homed client 210, and/or endpoint device 235 may include one or more devices 325 and/or one or more components of device 325. As shown in FIG. 3B, device 325 may include a bus 330, a processor 335, a memory 340, a storage component 345, an input component 350, an output component 355, and a communication interface 360.

Bus 330 may include a component that permits communication among the components of device 325. Processor 335 is implemented in hardware, firmware, or a combination of hardware and software. Processor 335 may include a processor (e.g., a CPU, a GPU, an APU, etc.), a microprocessor, and/or any processing component (e.g., an FPGA, an ASIC, etc.) that interprets and/or executes instructions. In some implementations, processor 335 may include one or more processors that are programmed to perform a function. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 325 may perform one or more processes described herein. Device 325 may perform these processes in response to processor 335 executing software instructions stored by a non-transitory computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as examples. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

Figure 4:
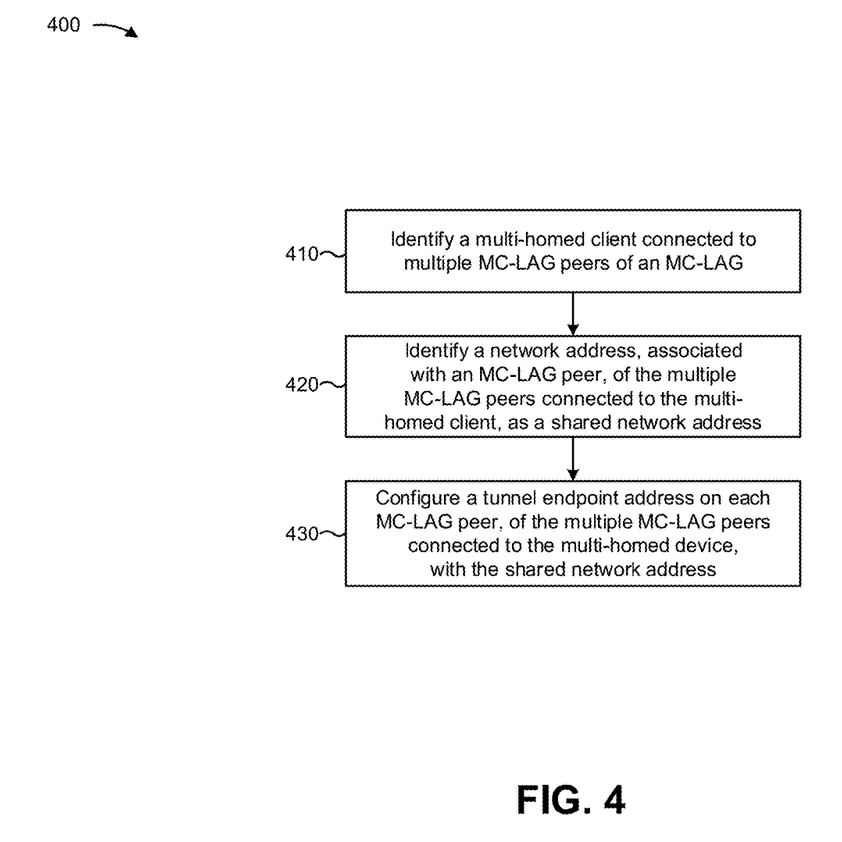
FIG. 4 is a flow chart of an example process for configuring a tunnel endpoint address on each MC-LAG peer, of multiple MC-LAG peers of an MC-LAG, with a shared network address associated with a virtual extensible local area network (VXLAN) tunnel.

FIG. 4 is a flow chart of an example process 400 for configuring a tunnel endpoint address on each MC-LAG peer, of multiple MC-LAG peers of an MC-LAG, with a shared network address associated with a VXLAN tunnel. In some implementations, one or more process blocks of FIG. 4 may be performed by MC-LAG 220 (e.g., one or more MC-LAG peers 215 of MC-LAG 220). In other words, an operation described as being performed by MC-LAG 220 is performed by one or more MC-LAG peers 215 of MC-LAG 220. In some implementations, one or more process blocks of FIG. 4 may be performed by another device or a group of devices separate from or including MC-LAG 220, such as another device of environment 200.

As shown in FIG. 4, process 400 may include identifying a multi-homed client connected to multiple MC-LAG peers of an MC-LAG (block 410). For example, MC-LAG 220 may identify multi-homed client 210 connected to multiple MC-LAG peers 215 of MC-LAG 220. In some implementations, MC-LAG 220 may identify multi-homed client 210 when MC-LAG 220 is configured (e.g., based on user input). Additionally, or alternatively, MC-LAG 220 may identify multi-homed client 210 when MC-LAG 220 is created, comes online, or the like, when MC-LAG peer 215 is created, is configured, comes online, powers up, or the like.

In some implementations, MC-LAG 220 may identify multi-homed client 210 based on a configuration of MC-LAG 220. For example, a user (e.g., associated with configuring MC-LAG 220) may provide, during configuration and/or setup of MC-LAG 220, user input that identifies a client device as a multi-homed client 210.

Additionally, or alternatively, MC-LAG 220 may identify multi-homed client 210 based on detecting multiple connections with multi-homed client 210. For example, a first MC-LAG peer 215 of MC-LAG 220 may detect (e.g., based on sending a request and receiving a response, based on a message provided by MC-LAG peer 215, etc.) a first connection between the first MC-LAG peer 215 and a client device, and a second MC-LAG peer 215 may detect a second connection between the second MC-LAG peer 215 and the client device. In this example, the first MC-LAG peer 215 and the second MC-LAG peer 215 may determine that each is included in MC-LAG 220 based on configurations of the first MC-LAG peer 215 and the second MC-LAG peer 215. For example, the first MC-LAG peer 215 and the second MC-LAG peer 215 may detect a set of links (e.g., an inter-chassis link (ICL) link, an inter-chassis control protocol for control information (ICCP) link, etc.) configured between the first MC-LAG peer 215 and the second MC-LAG peer 215, and may determine that each MC-LAG peer 215 is included in MC-LAG 220.

Here, MC-LAG 220 may identify, based on detecting the first connection, the second connection, and the set of links forming the MC-LAG 220, the client device as a multi-homed client 210. Notably, while MC-LAG 220 may be aware of multi-homed client 210, multi-homed client 210 may not be aware of each MC-LAG peer 215. Rather, multi-homed client 210 may only be aware of MC-LAG 220 (i.e., multi-homed client device 210 may treat MC-LAG 220 as a single device). In some implementations, MC-LAG 220 may identify one or more multi-homed clients 210 connected to MC-LAG 220. In some implementations, VXLAN tunnels, and corresponding tunnel liveness sessions, of multi-homed client 210 be maintained across the multiple MC-LAG peers 215 to which multi-homed client 210 is connected, as described below.

In some implementations, MC-LAG 220 may also identify one or more single-homed clients 205 associated with MC-LAG 220. For example, MC-LAG 220 may identify single-homed client 205 based on a configuration of MC-LAG 220 and/or based on detecting a single connection between an MC-LAG peer 215 of MC-LAG 220 and a client device, in a manner similar to that described above. In some implementations, a VXLAN tunnel, and a corresponding tunnel liveness session, of single-homed client 205 may be maintained on MC-LAG peer 215 to which single-homed client 205 is connected, as described below.

As further shown in FIG. 4, process 400 may include identifying a network address, associated with an MC-LAG peer of the multiple MC-LAG peers connected to the multi-homed client, as a shared network address (block 420). For example, MC-LAG 220 may identify a network address, associated with an MC-LAG peer 215 of the multiple MC-LAG peers 215 connected to multi-homed client 210, as a shared network address. In some implementations, MC-LAG 220 may identify the network address as the shared network address after MC-LAG 220 identifies multi-homed client 210. Additionally, or alternatively, MC-LAG 220 may identify the network address when MC-LAG 220 selects an MC-LAG peer 215, of the multiple MC-LAG peers 215 connected to multi-homed client 210, as an active peer, as described below.

The shared network address may include a network address that is to be configured on the multiple MC-LAG peers 215 connected to multi-homed client 210 in order to cause a VXLAN tunnel, associated with multi-homed client 210, to initiate and/or terminate on any of the multiple MC-LAG peers 215 configured with the shared network address. For example, the shared address may include an IP address, such as an IP address associated with a loopback interface of a particular MC-LAG peer 215 of the multiple MC-LAG peers 215 connected to multi-homed client 210. In some implementations, the shared network address may be used as a source VTEP at which the VXLAN tunnel, via which multi-homed client 210 sends and/or receives VXLAN traffic, is initiated and/or terminated.

In some implementations, MC-LAG 220 may identify the shared network address based on selecting a particular MC-LAG peer 215, of the multiple MC-LAG peers 215, as an active peer. The active peer may include a MC-LAG peer 215 that, traditionally, would maintain a VXLAN tunnel and/or maintain a tunnel liveness session associated with the VXLAN tunnel (e.g., as describe above). For example, during configuration and/or setup of MC-LAG 220, a particular MC-LAG peer 215, of the MC-LAG peers 215 included in MC-LAG 220, may be selected (e.g., based on user input, automatically, etc.) as the active peer associated with a VXLAN tunnel. In this example, based on selecting the particular MC-LAG peer 215 as the active peer, MC-LAG 220 may identify a network address (e.g., a first IP address associated with a loopback interface of the active peer) as the shared network address.

In some implementations, the shared network address may be associated with the active peer of the multiple MC-LAG peers 215 connected to multi-homed client 210, as described above. Additionally, or alternatively, the shared network address may be associated with another MC-LAG peer 215 of the multiple MC-LAG peers 215 connected to multi-homed client 210.

As further shown in FIG. 4, process 400 may include configuring a tunnel endpoint address on each MC-LAG peer, of the multiple MC-LAG peers, with the shared network address (block 430). For example, MC-LAG 220 may configure a tunnel endpoint address on each MC-LAG peer 215, of the multiple MC-LAG peers 215 connected to multi-homed client 210, with the shared network address. In some implementations, MC-LAG 220 may configure the tunnel endpoint address on each MC-LAG peer 215 after MC-LAG 220 identifies the shared network address.

The tunnel endpoint address may include a network address associated with initiating and/or terminating a VXLAN tunnel. In other words, the tunnel endpoint address may include a network address to which VXLAN packets may be directed for encapsulation and/or decapsulation.

In some implementations, MC-LAG 220 may configure a tunnel endpoint address, such as a source VTEP, on each MC-LAG peer 215 of the multiple MC-LAG peers 215 connected to multi-homed client 210, with the shared network address (e.g., the first IP address associated with the loopback interface of the active peer). For example, MC-LAG 220 may edit, modify, overwrite, or the like, a first source VTEP address field, associated with each of the multiple MC-LAG peers 215, in order to cause each of the first source VTEP fields to include the shared network address. In some implementations, each MC-LAG peer 215 may store information that identifies a VXLAN tunnel (e.g., a VXLAN network identifier (VNI)) corresponding to the shared network address. Additionally, or alternatively, each MC-LAG peer 215 may store information indicating that the shared network address is associated with a VXLAN tunnel that is to be maintained across multiple MC-LAG peers 215.

In some implementations, configuring each MC-LAG peer 215 of the multiple MC-LAG peers 215 connected to multi-homed client 210 may allow VXLAN traffic, associated with the VXLAN tunnel, to be provided via any of the multiple MC-LAG peers 215 connected to multi-homed client 210. For example, information included in the first source VTEP address field may be made available to edge device 225 (e.g., via an equal-cost multi-path (ECMP) link). Here, edge device 225 may receive VXLAN tunnel traffic (e.g., a VXLAN packet), may determine the information included in the first source VTEP field (i.e., the shared network address), and may, based on the shared network address, provide the tunnel traffic to any of the multiple MC-LAG peers 215 on which the shared network address is configured. In this way, MC-LAG 220 may be capable of initiating and/or terminating a VXLAN tunnel on any of the multiple MC-LAG peers 215 connected to multi-homed client 210. Moreover, redundancy of the VXLAN tunnel may be achieved since the VXLAN tunnel may be initiated and/or terminated on any of the multiple MC-LAG peers 215.

Additionally, or alternatively, MC-LAG 220 may configure an individual network address on an MC-LAG peer 215 connected to single-homed client 205. The individual network address may include a network address (e.g., an IP address, associated with a loopback interface, that is different than the shared network address) that, when configured on MC-LAG peer 215 connected to single-homed client 205, causes a VXLAN tunnel, associated with single-homed client 205, to initiate and/or terminate only on the MC-LAG peer 215 configured with the individual network address. In this way, MC-LAG 220 may be capable of initiating and/or terminating a VXLAN tunnel on an MC-LAG peer 215 to which single-homed client 205 is connected.

In some implementations, a particular MC-LAG peer 215 may be configured with one or more shared network addresses and/or one or more individual network addresses. For example, a particular MC-LAG peer 215 may be configured with a first shared network address (e.g., a first IP address associated with a loopback interface of the active peer) associated with a first VXLAN tunnel for a first multi-homed client 210. The particular MC-LAG peer 215 may also be configured with a second shared network address (e.g., a second IP address associated with the loopback interface of the active peer) associated with a second VXLAN tunnel for a second multi-homed client 210. The particular MC-LAG peer 215 may also be configured with an individual network address (e.g., a first IP address associated with a loopback interface of the particular MC-LAG peer 215) associated with a third VXLAN tunnel for a single-homed client 205 connected to the particular MC-LAG peer 215.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
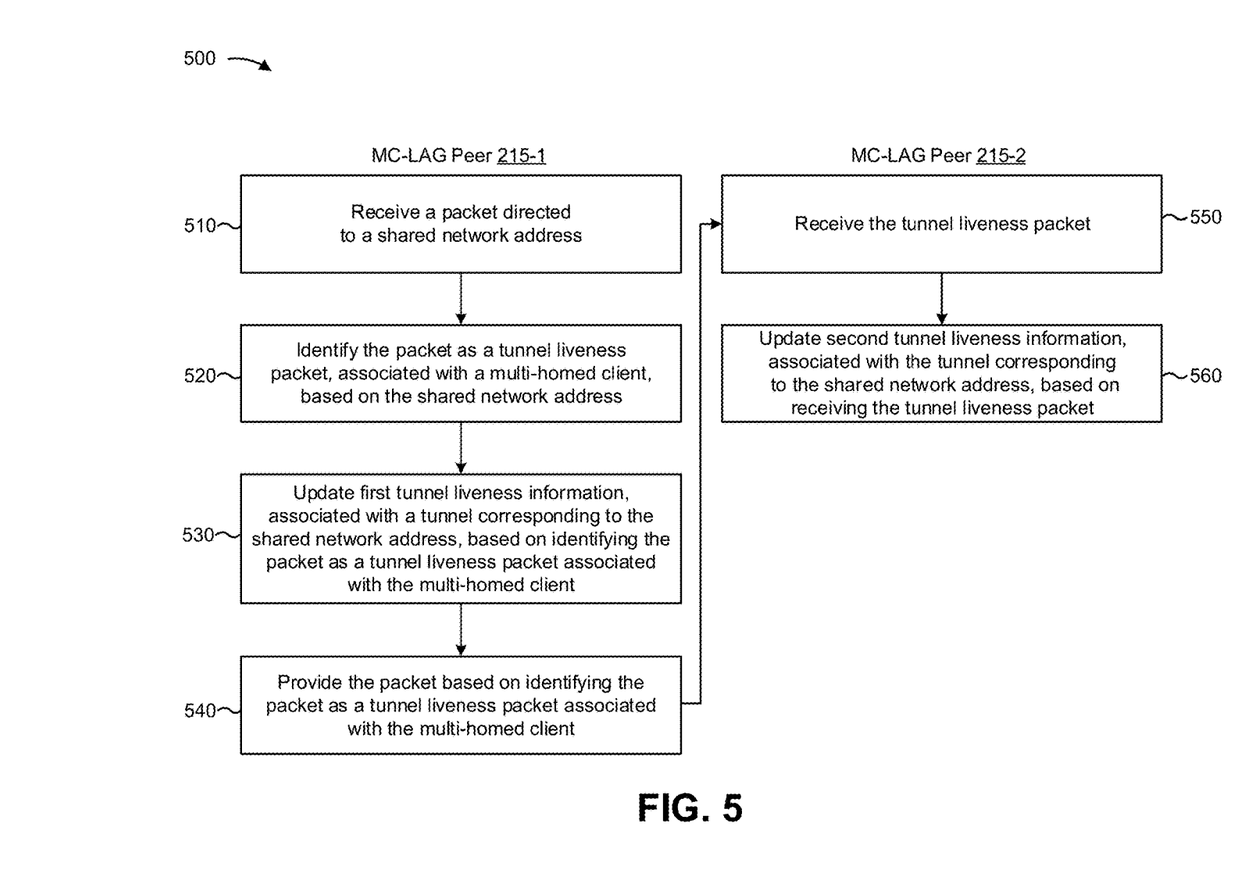
FIG. 5 is a flow chart of an example process for maintaining tunnel liveness information, associated with a VXLAN tunnel, on multiple MC-LAG peers of an MC-LAG.

FIG. 5 is a flow chart of an example process 500 for maintaining tunnel liveness information, associated with a VXLAN tunnel, on multiple MC-LAG peers of an MC-LAG. In some implementations, one or more process blocks of FIG. 5 may be performed by a pair of MC-LAG peers 215 of MC-LAG 220. In some implementations, one or more process blocks of FIG. 5 may be performed by another device or a group of devices separate from or including the pair of MC-LAG peers 215 of MC-LAG 220, such as another device of environment 200.

As shown in FIG. 5, process 500 may include receiving a packet directed to a shared network address (block 510). For example, a first MC-LAG peer 215, of multiple MC-LAG peers 215 connected to multi-homed client 210, may receive a packet directed to a shared network address. In some implementations, the first MC-LAG peer 215 may receive the packet when another device provides the packet, such as when edge device 225 provides the packet. For example, edge device 225 may receive a packet that is directed to the shared network address, may make an ECMP routing decision (e.g., a decision associated with selecting an MC-LAG peer 215 to which the packet is to be provided), and may provide the packet to the first MC-LAG peer 215 based on the ECMP routing decision.

In some implementations, the first MC-LAG peer 215, upon receiving the packet, may identify the packet as a VXLAN packet. For example, the first MC-LAG peer 215 may receive the packet and may inspect the packet (e.g., in order to identify a port to which the packet is directed). Here, the first MC-LAG peer 215 may identify the packet as a VXLAN packet based on information, stored or accessible by the first MC-LAG peer 215, indicating that the identified port is associated with VXLAN traffic.

As further shown in FIG. 5, process 500 may include identifying the packet as a tunnel liveness packet, associated with a multi-homed client, based on the shared network address (block 520). For example, the first MC-LAG peer 215 may identify the packet as a tunnel liveness packet, associated with multi-homed client 210, based on the shared network address. In some implementations, the first MC-LAG peer 215 may identify the packet as a tunnel liveness packet, associated with multi-homed client 210, when the first MC-LAG peer 215 receives the packet. Additionally, or alternatively, the first MC-LAG peer 215 may identify the packet as a tunnel liveness packet when (e.g., after, concurrently with, etc.) the first MC-LAG peer 215 identifies the packet as a VXLAN packet.

A tunnel liveness packet may include a packet associated with a tunnel liveness session for detecting a failure associated with a tunnel. For example, a tunnel liveness packet may include a BFD packet associated with a BFD session for detecting a failure associated with a VXLAN tunnel.

In some implementations, the first MC-LAG peer 215 may identify the packet as a tunnel liveness packet, associated with multi-homed client 210, based on inspecting the packet. For example, the first MC-LAG peer 215 may receive the packet and may inspect the packet (e.g., in order to identify a port to which the packet is directed). Here, the first MC-LAG peer 215 may identify the packet as a tunnel liveness packet based on information, stored or accessible by the first MC-LAG peer 215, indicating that the identified port is associated with a tunnel liveness session for a VXLAN tunnel.

In this example, the first MC-LAG peer 215 may also determine, based on the shared network address, that the tunnel liveness packet is associated with multi-homed client 210. For example, the first MC-LAG peer 215 may store or have access to information indicating that the shared network address is associated with multi-homed client 210. Here, upon determining that the tunnel liveness packet includes the shared network address, the first MC-LAG peer 215 may determine that the tunnel liveness packet is associated with multi-homed client 210.

As further shown in FIG. 5, process 500 may include updating first tunnel liveness information, associated with a tunnel corresponding to the shared network address, based on identifying the packet as a tunnel liveness packet associated with the multi-homed client (block 530). For example, the first MC-LAG peer 215 may update first tunnel liveness information, associated with a VXLAN tunnel corresponding to the shared network address, based on identifying the packet as a tunnel liveness packet associated with multi-homed client 210. In some implementations, the first MC-LAG peer 215 may update the first tunnel liveness information after the first MC-LAG peer 215 identifies the packet as a tunnel liveness packet associated with multi-homed client 210.

The first tunnel liveness information may include information, associated with a first instance of a tunnel liveness session maintained by the first MC-LAG peer 215, indicating that the tunnel, associated with the tunnel liveness packet, is operational. For example, the first tunnel liveness information may include a timer that, upon reaching a threshold, may indicate that the tunnel, associated with the timer, has experienced a failure. Here, upon identifying the tunnel liveness packet, the first MC-LAG peer 215 may reset the timer. As another example, the first tunnel liveness information may include a state machine associated with monitoring an operational status of the VXLAN tunnel.

As further shown in FIG. 5, process 500 may include providing the packet based on identifying the packet as a tunnel liveness packet associated with the multi-homed client (block 540). For example, the first MC-LAG peer 215 may provide the packet based on identifying the packet as a tunnel liveness packet associated with multi-homed client 210. In some implementations, the first MC-LAG peer 215 may provide the packet when the first MC-LAG peer 215 identifies the packet as a tunnel liveness packet associated with multi-homed client 210. Additionally, or alternatively, the first MC-LAG peer 215 may provide the packet when (e.g., before, after, concurrently with, etc.) the first MC-LAG peer 215 updates the first tunnel liveness information.

In some implementations, the first MC-LAG peer 215 may provide the packet to one or more other MC-LAG peers 215 of MC-LAG 220, such as a second MC-LAG peer 215 configured to maintain the VXLAN tunnel associated with the packet. For example, the first MC-LAG peer 215 may identify, based on the shared network address and information stored or accessible by the first MC-LAG peer 215, a second MC-LAG peer 215 configured with the shared network address and/or associated with the VXLAN tunnel. In other words, the first MC-LAG peer 215 may identify another MC-LAG peer 215 configured to maintain the VXLAN tunnel. Here, the first MC-LAG peer 215 may provide the tunnel liveness packet to the second MC-LAG peer 215 (e.g., such that the second MC-LAG peer 215 may update corresponding tunnel liveness information, as described below). In some implementations, the first MC-LAG peer 215 may provide the tunnel liveness packet via a link between the first MC-LAG peer 215 and the second MC-LAG peer 215, such as an inter-chassis link (ICL).

As further shown in FIG. 5, process 500 may include receiving the tunnel liveness packet (block 550). For example, the second MC-LAG peer 215 of MC-LAG 220 may receive the tunnel liveness packet. In some implementations, the second MC-LAG peer 215 may receive the tunnel liveness packet when the first MC-LAG peer 215 provides the tunnel liveness packet (e.g., via the ICL).

As further shown in FIG. 5, process 500 may include updating second tunnel liveness information, associated with the tunnel corresponding to the shared network address, based on receiving the tunnel liveness packet (block 560). For example, the second MC-LAG peer 215 may update second tunnel liveness information, associated with the tunnel corresponding to the shared network address, based on receiving the tunnel liveness packet, associated with multi-homed client 210, provided by the first MC-LAG peer 215. In some implementations, the second MC-LAG peer 215 may update the second tunnel liveness information when the second MC-LAG peer 215 receives the tunnel liveness packet from the first MC-LAG peer 215.

The second tunnel liveness information may include information, associated with a second instance of the tunnel liveness session maintained by the second MC-LAG peer 215, indicating that the VXLAN tunnel, associated with the tunnel liveness packet, is operational. For example, the second tunnel liveness information may include a timer similar to that described above with regard to the timer of the first MC-LAG peer 215. In some implementations, the second MC-LAG peer 215 may identify, based on the shared network address, the tunnel liveness packet as being associated with the second tunnel liveness information, and may update the second tunnel liveness information, accordingly.

In this way, each MC-LAG peer 215, associated with the VXLAN tunnel, may update a respective instance of a tunnel liveness session associated with the VXLAN tunnel (e.g., such that each of the MC-LAG peers 215 maintains a matching tunnel liveness session). This may improve VXLAN service by providing redundancy for the tunnel liveness session associated with the VXLAN tunnel.

In some implementations, a single MC-LAG peer 215 (e.g., the first MC-LAG peer 215, the second MC-LAG peer 215, etc.) may maintain a tunnel liveness session associated with single-homed client 205 concurrently with maintaining an instance of a tunnel liveness session associated with multi-homed client 210. For example, assume that the first MC-LAG peer 215 receives a packet, identifies the packet as a tunnel liveness packet, and identifies (e.g., based on an individual network address included in the packet) the tunnel liveness packet as being associated with a VXLAN tunnel, associated with single-homed client 205, maintained by the first MC-LAG peer 215 only. Here, the first MC-LAG peer 215 may update tunnel liveness information, associated with the VXLAN tunnel corresponding to the individual network address, in a manner similar to that described above. In this example, the first MC-LAG peer 215 may not provide the tunnel liveness packet to any other MC-LAG peers 215 (e.g., since no other MC-LAG peers 215 maintain an instance of the tunnel liveness session associated with the VXLAN tunnel). As such, tunnel liveness sessions associated with both single-homed clients 205 and multi-homed clients 210 may be maintained.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may allow an MC-LAG to initiate and/or terminate a VXLAN tunnel on multiple MC-LAG peers of the MC-LAG, while maintaining a tunnel liveness session, associated with the VXLAN tunnel, across the multiple MC-LAG peers. This may allow for improved VXLAN service by providing redundancy for both the VXLAN tunnel and the tunnel liveness session. For example, when an active MC-LAG peer, of the multiple MC-LAG peers, is rebooted, changes mode, is powered-off, fails, or the like, the ability of the MC-LAG to initiate and/or terminate the tunnel on any other of the multiple MC-LAG peers, coupled with the concurrent maintenance of the tunnel liveness session on the multiple MC-LAG lag peers, allows the MC-LAG to continue operation without any loss of traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A multi-chassis link aggregation group (MC-LAG), comprising:
a first MC-LAG peer, of a plurality of MC-LAG peers, to:
receive a packet directed to a network address,
the network address being a tunnel endpoint address of a tunnel via which traffic, associated with a multi-homed client, is transferred, and
the multi-homed client being connected to each MC-LAG peer of the plurality of MC-LAG peers;
identify the packet as a tunnel liveness packet, associated with the multi-homed client, based on the network address,
the tunnel liveness packet including a bidirectional forwarding detection (BFD) packet for detecting a failure associated with the tunnel;
update first tunnel liveness information, associated with the tunnel, based on identifying the packet as the tunnel liveness packet,
the first tunnel liveness information corresponding to a first instance of a BFD session; and
provide the packet to a second MC-LAG peer, of the plurality of MC-LAG peers, to cause second tunnel liveness information, associated with the tunnel, to be updated,
the second tunnel liveness information corresponding to a second instance of the BFD session, and
the first tunnel liveness information and the second tunnel liveness information being updated to indicate an operational status of the tunnel; and
the second MC-LAG peer.

2. The MC-LAG of claim 1, where the first MC-LAG peer is to:
identify a particular MC-LAG peer, of the plurality of MC-LAG peers, as an active peer; and
configure the tunnel endpoint address, on each MC-LAG peer of the plurality of MC-LAG peers, with the network address based on identifying the particular MC-LAG peer as the active peer,
the network address corresponding to the active peer.

3. The MC-LAG of claim 1, where the tunnel is a virtual extensible local area network (VXLAN) tunnel.

4. The MC-LAG of claim 1, where the first MC-LAG peer is to:
inspect the packet based on receiving the packet; and
identify the packet as a tunnel liveness packet based on inspecting the packet.

5. The MC-LAG of claim 1,
where the packet is a first packet,
where the network address is a first network address,
where the tunnel is a first tunnel, and
where the first MC-LAG peer is further to:
receive a second packet directed to a second network address,
the second network address being a tunnel endpoint address of a second tunnel via which traffic, associated with a single-homed client, is transferred,
the single-homed client being connected to the first MC-LAG peer without being connected to any other MC-LAG peer of the plurality of MC-LAG peers;
identify the packet as a tunnel liveness packet, associated with the single-homed client, based on the second network address; and
update third tunnel liveness information, associated with the second tunnel, based on identifying the packet as a tunnel liveness packet associated with the single-homed client.

6. The MC-LAG of claim 1, where the network address is an Internet protocol (IP) address associated with a loopback interface.

7. The MC-LAG of claim 1, where the first MC-LAG peer is to:
identify the multi-homed client when the MC-LAG is configured, created, or comes online,
identify the network address as a shared network address after identifying the multi-homed client; and
configure the shared network address on the plurality of MC-LAG peers.

8. A non-transitory computer-readable medium storing instructions, the instructions comprising:
one or more instructions that, when executed by one or more processors, cause the one or more processors to:
receive a packet destined for a network address corresponding to a tunnel endpoint of a tunnel via which traffic, associated with a multi-homed client, can be transferred,
the multi-homed client being connected to each multi-chassis link aggregation group (MC-LAG) peer of a plurality of MC-LAG peers;
identify the packet as a tunnel liveness packet associated with the multi-homed client,
the tunnel liveness packet including a bidirectional forwarding detection (BFD) packet for detecting a failure associated with the tunnel;
update a first instance of a tunnel liveness session, associated with the tunnel, based on identifying the packet as the tunnel liveness packet,
the first instance of the tunnel liveness session being a first instance of a BFD session, and
the first instance of the tunnel liveness session being maintained by a first MC-LAG peer of the plurality of MC-LAG peers; and
provide the packet to cause a second instance of the tunnel liveness session, associated with the tunnel, to be updated,
the second instance of the tunnel liveness session being a second instance of the BFD session,
the second instance of the tunnel liveness session being maintained by a second MC-LAG peer of the plurality of MC-LAG peers,
the first instance of the tunnel liveness session and the second instance of the tunnel liveness session being updated such that the tunnel liveness session is concurrently maintained by the first MC-LAG peer and the second MC-LAG peer.

9. The non-transitory computer-readable medium of claim 8, where the one or more instructions, when executed by the one or more processors, further cause the one or more processors to:
identify a particular MC-LAG peer, of the plurality of MC-LAG peers, as an active peer; and
configure a tunnel endpoint address, on the first MC-LAG peer and the second MC-LAG peer, with the network address based on identifying the particular MC-LAG peer as the active peer,
the network address corresponding to the active peer.

10. The non-transitory computer-readable medium of claim 8, where the one or more instructions, that cause the one or more processors to provide the packet, further cause the one or more processors to:

provide the packet via an inter-chassis link (ICL) between the first MC-LAG peer and the second MC-LAG peer.

11. The non-transitory computer-readable medium of claim 8, where the one or more instructions, when executed by the one or more processors, further cause the one or more processors to:
inspect the packet based on receiving the packet; and
identify the packet as a tunnel liveness packet based on inspecting the packet.

12. The non-transitory computer-readable medium of claim 8,
where the packet is a first packet,
where the network address is a first network address,
where the tunnel is a first tunnel, and
where the one or more instructions, when executed by the one or more processors, further cause the one or more processors to:
receive a second packet destined for a second network address corresponding to a second tunnel endpoint of a second tunnel via which traffic, associated with a single-homed client, can be transferred,
the single-homed client being connected to a single MC-LAG pair of the plurality of MC-LAG peers;
identify the packet as a tunnel liveness packet associated with the single-homed client; and
update an instance of a tunnel liveness session, associated with the second tunnel, based on identifying the packet as a tunnel liveness packet associated with the single-homed client.

13. The non-transitory computer-readable medium of claim 8, where the network address is an Internet protocol (IP) address associated with a loopback interface.

14. The non-transitory computer-readable medium of claim 8, where the tunnel is a virtual extensible local area network (VXLAN) tunnel.

15. A method, comprising:
receiving, by a first peer of a plurality of multi-chassis link aggregation group (MC-LAG) peers, a packet directed to a network address,
the network address identifying a tunnel endpoint of a tunnel via which traffic, associated with a multi-homed client, is transferred, and
the multi-homed client being connected to each peer of the plurality of MC-LAG peers;
identifying, by the first peer and based on the network address, the packet as being associated with the multi-homed client,
the packet including a bidirectional forwarding detection (BFD) packet for detecting a failure associated with the tunnel;
updating, by the first peer, first information, associated with the tunnel, based on identifying the packet as being associated with the multi-homed client,
the first information being a first instance of a BFD session;
providing, by the first peer, the packet to a second peer of the plurality of MC-LAG peers;
receiving, by the second peer, the packet provided by the first peer; and
updating, by the second peer, second information, associated with the tunnel, based on receiving the packet provided by the first peer,
the second information being a second instance of the BFD session, and
the first information and the second information being updated to indicate an operational status of the tunnel.

16. The method of claim 15, further comprising:
selecting a particular peer, of the plurality of MC-LAG peers, as an active peer; and
configuring a tunnel endpoint address, on the first peer and the second peer, with the network address based on selecting the particular peer as the active peer,
the network address corresponding to the active peer.

17. The method of claim 16, where the network address is an Internet protocol (IP) address associated with a loopback interface of the active peer.

18. The method of claim 15, where providing the packet to the second peer comprises:
providing the packet via an inter-chassis link between the first peer and the second peer.

19. The method of claim 15,
where the packet is a first packet,
where the network address is a first network address,
where the tunnel is a first tunnel, and
where the method further comprises:
receiving a second packet directed to a second network address corresponding to a second tunnel endpoint of a second tunnel via which traffic, associated with a single-homed client, is transferred,
the single-homed client being connected to a single one of the plurality of MC-LAG peers;
identifying the packet as being associated with the single-homed client; and
updating third information, associated with the second tunnel, based on identifying the packet as being associated with the single-homed client.

20. The method of claim 15, where the tunnel is a virtual extensible local area network (VXLAN) tunnel.

* * * * *